Oct. 7, 1958
W. H. GOODWIN
2,855,459
PHASING SYSTEM AND MECHANISM FOR
PHASING A FACSIMILE RECEIVER
Filed Sept. 7, 1955
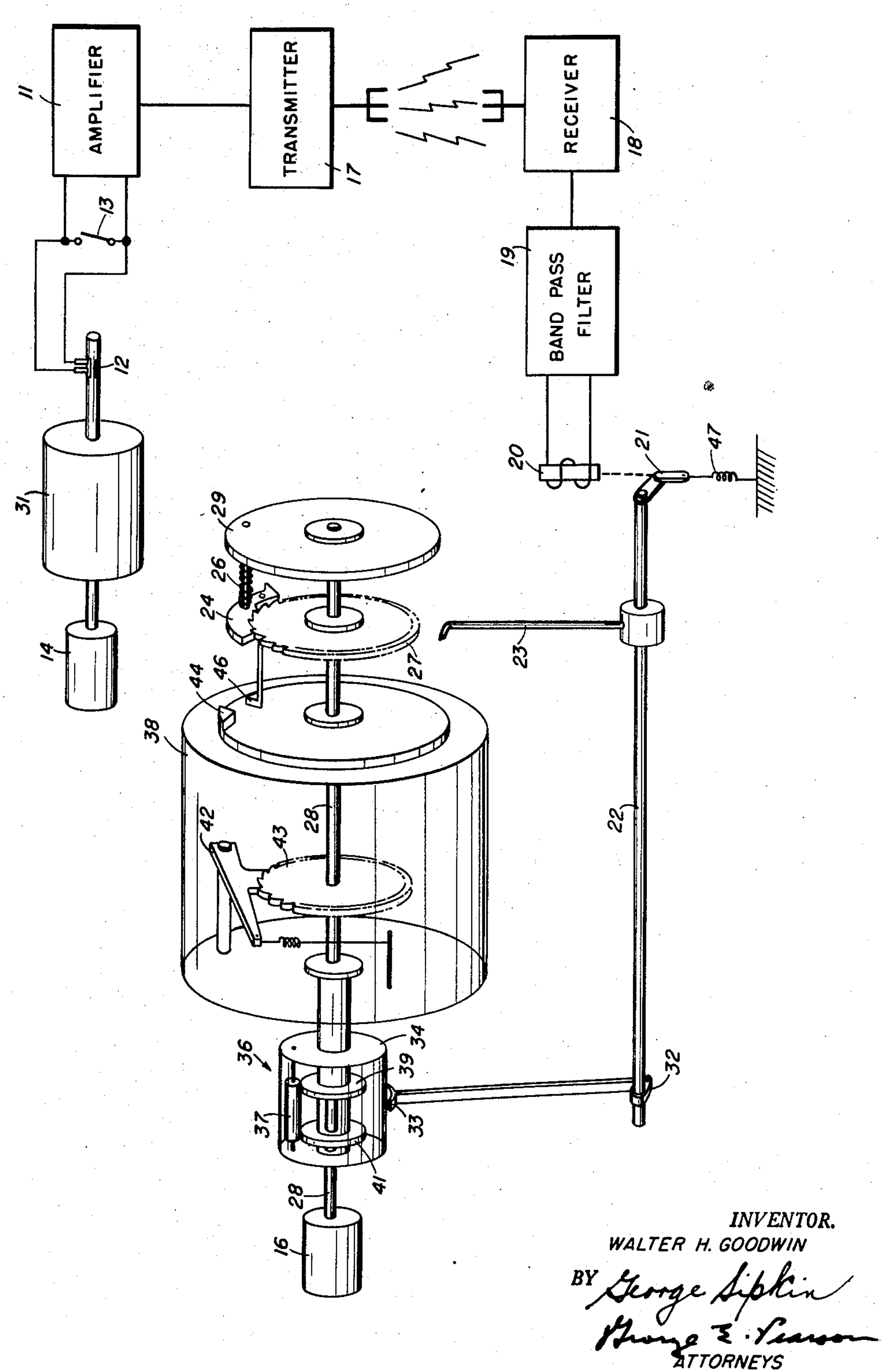
INVENTOR.
WALTER H. GOODWIN
BY George Lipkin
George E. Pearson
ATTORNEYS United States Patent Office 2,855,459

Patented Oct. 7, 1958

2,855,459

PHASING SYSTEM AND MECHANISM FOR PHASING A FACSIMILE RECEIVER

Walter H. Goodwin, Sierra Madre, Calif., assignor, by mesne assignments, to the United States of America as represented by the Secretary of the Navy Application September 7, 1955, Serial No. 533,040

8 Claims. (Cl. 178—69.5)

This invention relates to phasing systems and particularly to a phasing system and structure for phasing a facsimile receiver with a transmitter.

Phasing is accomplished by a series of 400 c. p. s. pulses sent automatically by the transmitter just before the scanning carriage reaches the beginning of the message. The phasing pulse is received through a 400 c. p. s. band pass filter and actuates a solenoid, releasing a pawl which immediately clamps onto the drum shaft. This pawl is actuated in synchronization and in phase with the message drum on the transmitter. The phasing solenoid also applies a brake to the cage of a 28/27 planetary transmission which speeds up the drum by 3.85%. The drum continues to run faster than the shaft until a projection on the drum meets the pawl at which time the drum is in phase with the transmitter drum. The pawl prevents further speed up of the drum and the brake slips until it is released at the end of the phasing period. To hold the drum in phase after the phasing period at which time the pawl is released, a rachet detent is used.

An object of this invention is the provision of an improved phasing system and apparatus for bringing synchronously driven remotely spaced revolving drums into correct phase relationship.

Another object is the provision of a phasing system and apparatus for establishing the correct phasing relationship of a receiver drum with the transmitter message drum and maintaining this relationship during transmission of a message.

Another object is the provision of a phasing system in which the transmitter prior to message transmission sends out a phasing pulse which actuates apparatus in the receiver to bring the receiver drum in phase with the transmitter drum.

Still another object is the provision of a phasing system and apparatus which will bring the receiver drum in phase relationship with the transmitter drum automatically after actuation by only one phasing pulse "burst."

Another object is the provision of phasing apparatus which is light in weight, dependable in service, simple in construction and automatic in operation.

Other objects and many of the attendant advantages of this invention will be readily appreciated as the same becomes better understood by reference to the following detailed description when considered in connection with the accompanying drawings wherein:

The drawing shows a symbolic view of the phasing system.

The transmitter of the facsimile equipment contains a phasing signal generator in the form of a simple oscillator 11 tuned to approximately 400 c. p. s. This oscillator actually is the first signal amplifier stage which can be set in oscillation by opening an external switch, in the form of a commutator 12 on the transmitter drum shaft. This commutator is shorted by another switch 13 except during the phasing portion of the operating cycle. Approximately two seconds after the start of transmission, the phasing period begins. (2 seconds is enough time for both transmitter and receiver motors 14, 16 to come to synchronous speed.) During the phasing period the transmitter 17 sends out a short "burst" of 400 c. p. s. signal once every revolution. The receiver 18 contains a 400 c. p. s. band pass filter 19. When the first full "burst" of 400 c. p. s. passes through the filter, it initiates the phasing cycle in the receiver. After the first phasing pulse has been used by the receiver, all subsequent pulses are redundant and can be ignored. The phasing pulse initiates the receiver phasing cycle, which in turn causes the phasing solenoid 20 to be actuated for a period of time long enough for the maximum required phasing period. This phasing period is selected for phasing in the extreme case where the receiver is 359° out of phase at the start of the period.

The phasing solenoid 20, through crank link 21, rotates the solenoid shaft 22 counterclockwise which, in turn, moves pawl 23, releasing trigger 24. The trigger 24 is then forced in by spring 26 against the ratchet wheel 27 which is secured to shaft 28 and rotates throughout the phasing period at the synchronous speed as determined by motor 16. As soon as the teeth of trigger 24 engage the teeth of ratchet wheel 27, the trigger 24 and its carrier 29 start to rotate in synchronism and in phase with the transmitter message drum 31.

The solenoid shaft 22 also rotates the brake crank arm 32 forcing the brake shoe 33 against the brake drum 34. The brake drum is integral with the planet gearing cage 36. Holding the planet cage 36 and planet gear 37 causes receiver drum 38, which is mounted integrally with the inboard sun gear 39, to rotate at a speed 28/27 times that of the drum shaft 28 and the outboard sun gear 41. While the drum 38 is rotating faster than shaft 28, the pawl of the ratchet detent 42 ratchets over the ratchet wheel 43 which rotates at shaft speed.

As the drum 38 comes into phase with the transmitter drum 31, the dog 44 on the drum 38 overtakes and contacts the projection 46 on the trigger 24. Since dog 44 cannot pass projection 46 (while trigger 24 engages ratchet wheel 27), the receiver drum 38 stays in phase with the transmitter drum 31 during the phasing period. During the latter portion of this period some portion of the driving means tending to drive the drum 38 faster than shaft 28 must fail to prevent damage to the driving gears. In this case it is the friction brake shoe 33 which slips allowing planet cage 36 to revolve. The brake can easily be adjusted to perform this dual function of holding the cage during the initial portion of the phasing period and slipping after the dog 44 engages projection 46 to retard the speed of drum 38.

At the conclusion of the phasing period (usually up to 5 seconds if the drums are out of phase by 359°), solenoid 20 is released and spring 47 rotates the solenoid shaft 22 clockwise. This releases brake shoe 33 from brake drum 44, allowing planet cage 36 to revolve freely, releasing the gears for driving drum 38 at shaft speed. This also moves pawl 23 into the path of trigger 24 releasing it from ratchet wheel 27. As trigger 24 is pivoted out of engagement, projection 46 is also pivoted out of the path of dog 44. The ratchet detent 42 and wheel 43 now holds the drum 38 in phase with transmitter drum 31 and the phasing system is automatically in pre-triggering position, ready for the phasing signal prior to transmission of a second message.

While this system just described was used initially in connection with portable facsimile equipment, it can be used whenever two remote members are desired to be synchronized and rotated in correct phasing relationship. By delaying the phasing signal in the receiver a pre-determined time, the drums can also be driven out-of-phase by a desired pre-determined amount.

Obviously many modifications and variations of the present invention are possible in the light of the above teachings. It is therefore to be understood that within the scope of the appended claims the invention may be practiced otherwise than as specifically described.

What is claimed is:

1. In a system for phasing two revolving members, a first motor, driving shaft and drum, a commutator segment on said shaft, brushes contacting said segment once for each revolution of said shaft, circuit means connected to said brushes for energizing a pulse generating oscillator upon contact of said brushes with said segment, switch means in said circuit means in parallel with said brushes normally closing said circuit, and transmitter means connected to said oscillator for transmitting pulses from said oscillator upon opening said switch and during energization of said oscillator, a solenoid, receiver means for receiving said pulses and converting them into electrical energy for driving said solenoid, a second motor and driving shaft with drum thereon, said second motor driving said second drum in synchronism with said first drum, mechanical means actuated by said solenoid for increasing the speed of said second drum until said second drum is in phase with said first drum, said mechanical means for increasing the speed of said second drum becoming de-activated upon de-activation of said solenoid.

2. In a system for phasing two revolving members, a drum, a motor and driving shaft, direct drive means for driving said drum at shaft speed, cooperatively engageable first stop means on said drum and complementary engageable second stop means arranged for driving engagement with said driving shaft, means responsive to a phasing signal for engaging said second stop means into driving engagement with said shaft and into the path of rotation of said first stop means on said drum, increased speed driving means including a planetary transmission operatively connected to said direct drive means and said drum, releasable means responsive to said signal for causing said increased speed driving means to drive said drum at a speed greater than said driving shaft so that said first drum stop means overtakes and engages said second stop means thereby causing said drum to slow down and to rotate at shaft speed, said releasable means partially releasing said increased speed driving means for driving said drum upon engagement of said first stop means with said second stop means, and means responsive to the termination of said phasing signal for completely releasing said increased speed driving means, said direct drive means again driving said drum at shaft speed.

3. In a system for phasing two revolving members, a drum, a motor and driving shaft direct drive means for driving said drum at shaft speed, cooperatively engageable first stop means on said drum and complementary engageable second stop means arranged for driving engagement with said driving shaft, means responsive to a phasing signal for engaging said second stop means into driving engagement with said shaft and into the path of rotation of said first stop means on said drum, increased speed driving means including a planetary transmission operatively connected to said direct drive means and said drum, releasable means responsive to said signal for causing said increased speed driving means to drive said drum at a speed greater than said driving shaft so that said first drum stop means overtakes and engages said second stop means thereby causing said drum to slow down and to rotate at shaft speed, said releasable means partially releasing said increased speed driving means from driving said drum upon engagement of said first stop means with said second stop means, and means responsive to the termination of said phasing signal for completely releasing said increased speed driving means and removing said second stop means from the path of rotation of said first stop means, said direct drive means again driving said drum at shaft speed.

4. In a system for phasing two revolving members, a drum, a motor and driving shaft, direct drive means for driving said drum at shaft speed, cooperatively engageable first stop means on said drum and complementary engageable second stop means arranged for driving engagement with said driving shaft, means responsive to a phasing signal for engaging said second stop means into driving engagement with said shaft and into the path of rotation of said first stop means on said drum, increased speed driving means including a planetary transmission operatively connected to said direct drive means and said drum, releasable means responsive to said signal for causing said increased speed driving means to drive said drum at a speed greater than said driving shaft so that said first drum stop means overtakes and engages said second stop means thereby causing said drum to slow down and to rotate at shaft speed, said releasable means partially releasing said increased speed driving means from driving said drum upon engagement of said first stop means with said second stop means, and means responsive to the termination of said phasing signal for completely releasing said increased speed driving means and removing said second stop means from the path of rotation of said first stop means, said direct drive means again driving said drum at shaft speed, and means comprising a ratchet wheel connected to said drive shaft and a spring urged ratchet detent connected to said drum and engaging said ratchet wheel for unidirectional relative movement.

5. In a system for phasing two revolving members, a drum, a motor and driving shaft, direct drive means for driving said drum at shaft speed, cooperatively engageable first stop means on said drum and complementary engageable second stop means arranged for driving engagement with said driving shaft, means responsive to a phasing signal for engaging said second stop means into driving engagement with said shaft and into the path of rotation of said first stop means on said drum, increased speed driving means, releasable means responsive to said signal for causing said increased speed driving means to drive said drum at a speed greater than said driving shaft so that said first drum stop means overtakes and engages said second stop means thereby causing said drum to slow down and to rotate at shaft speed, said releasable means partially releasing said increased speed driving means from driving said drum upon engagement of said first stop means with said second stop means, and means responsive to the termination of said phasing signal for completely releasing said increased speed driving means, said direct drive means again driving said drum at shaft speed, said means for engaging said second stop means into driving engagement with said shaft and into the path of rotation of said first stop means comprising a signal responsive solenoid actuated lever operated pawl, a ratchet wheel connected to said drive shaft, a spring urged ratchet detent trigger having a pawl engaging means thereon, a free-running disc on said drive shaft, said trigger rotatably mounted on said disc and adapted to engage said ratchet wheel upon release from said pawl, said second stop means being connected to said trigger and movable into the path of rotation of said first stop means upon release of said trigger from said pawl, said ratchet wheel moving said trigger, disc and second stop means at shaft speed upon reengagement of said trigger with said ratchet wheel.

6. In a system as in claim 3, said means for engaging said second stop means into driving engagement with said shaft and into the path of rotation of said first stop means comprising a trigger member revolvable about said shaft and rotatably mounted at a point spaced from the axis of rotation of said shaft, said trigger member adapted to engage said ratchet wheel for movement therewith and to carry said second stop means in the path of rotation of said first stop means, a signal responsive solenoid actuated lever operated pawl for disengaging said trigger from said ratchet wheel and moving said second stop means out of said path.

7. In a system for phasing two revolving members, a drum, a motor and driving shaft, direct drive means for driving said drum at shaft speed, cooperatively engageable first stop means on said drum and complementary engageable second stop means arranged for driving engagement with said driving shaft, means responsive to a phasing signal for engaging said second stop means into driving engagement with said shaft and into the path of rotation of said first stop means on said drum, increased speed driving means, releasable means responsive to said signal for causing said increased speed driving means to drive said drum at a speed greater than said driving shaft so that said first drum stop means overtakes and engages said second stop means thereby causing said drum to slow down and to rotate at shaft speed, said releasable means partially releasing said increased speed driving means from driving said drum upon engagement of said first stop means with said second stop means, and means responsive to the termination of said phasing signal for completely releasing said increased speed driving means, said direct drive means again driving said drum at shaft speed, said increased speed driving means comprising a gear connected to said shaft, a slightly smaller gear connected to said drum, and a planet gear connected to both said gears and adapted to revolve thereabout, and means for stopping said planet gear from revolving around said gears whereby said planet gear and said smaller gear drive said drum at a speed greater than shaft speed.

8. In a system for phasing two revolving members, a drum, a motor and driving shaft, direct drive means for driving said drum at shaft speed, cooperatively engageable first stop means on said drum and complementary engageable second stop means arranged for driving engagement with said driving shaft, means responsive to a phasing signal for engaging said second stop means into driving engagement with said shaft and into the path of rotation of said first stop means on said drum, increased speed driving means, releasable means responsive to said signal for causing said increased speed driving means to drive said drum at a speed greater than said driving shaft so that said first drum stop means overtakes and engages said second stop means thereby causing said drum to slow down and to rotate at shaft speed, said releasable means partially releasing said increased speed driving means from driving said drum upon engagement of said first stop means with said second stop means, and means responsive to the termination of said phasing signal for completely releasing said increased speed driving means, said direct drive means again driving said drum at shaft speed, said releasable means comprising a signal responsive solenoid actuated lever operated brake shoe, said increased speed driving means comprising a planetary housing and gearing between said drive shaft and said drum, a braking surface connected to said housing, said brake shoe when actuated frictionally engaging said braking surface, thereby preventing rotation of said housing thereby causing activation of said increased speed driving means.

References Cited in the file of this patent

UNITED STATES PATENTS

| | | |
|---|---|---|
| 2,530,516 | Finch | Nov. 21, 1950 |
| 2,630,495 | Wise | Mar. 3, 1953 |
| 2,704,306 | McFarlane | Mar. 15, 1955 |